D. D. JODOIN.
PICKER CHECK FOR LOOMS.
APPLICATION FILED APR. 22, 1921.
1,387,404.
Patented Aug. 9, 1921.
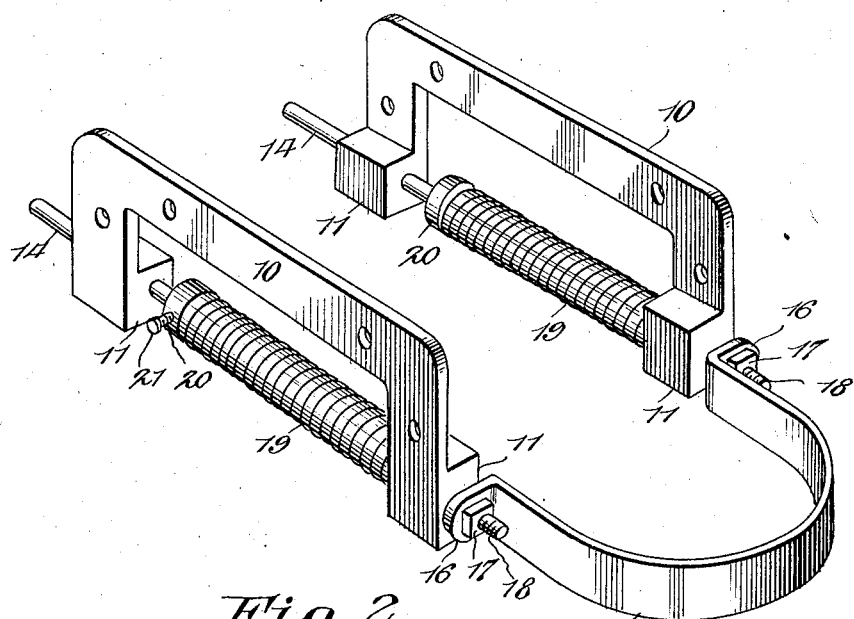
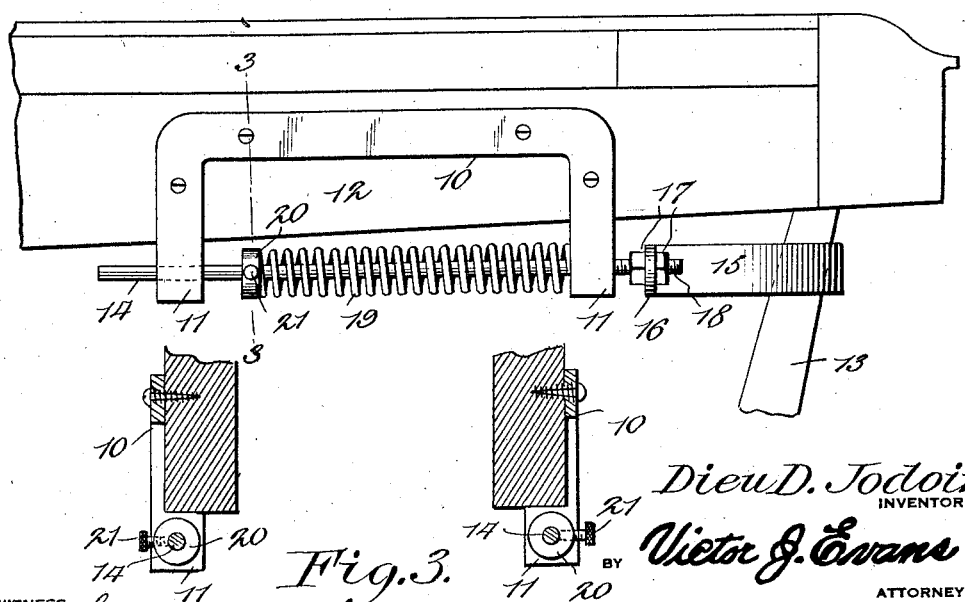
Dieu D. Jodoin,
INVENTOR

UNITED STATES PATENT OFFICE.

DIEU DONNE JODOIN, OF PLAINFIELD, CONNECTICUT.

PICKER-CHECK FOR LOOMS.

1,387,404.       Specification of Letters Patent.     Patented Aug. 9, 1921.

Application filed April 22, 1921. Serial No. 463,536.

*To all whom it may concern:*

Be it known that I, DIEU DONNE JODOIN, a citizen of the United States, residing at Plainfield, in the county of Windham and State of Connecticut, have invented new and useful Improvements in Picker-Checks for Looms, of which the following is a specification.

This invention relates to picker checks for looms.

Some of the objects of the present invention are: to produce a comparatively more thoroughly efficient and serviceable device; to render the device more susceptible to repair. With these and other objects in view the invention resides in the particular provision of parts and the manner of their association, hereinafter more fully described and illustrated in the accompanying drawing, in which:

Figure 1 is a perspective view of the device of the present invention.

Fig. 2 is a side elevation showing the application of the device to a part of a loom.

Fig. 3 is a transverse sectional view taken on the line 3—3, Fig. 2.

Referring now more particularly to the several views of the drawing for details, it will be manifest that the device includes a pair of brackets 10 each of which embodies bearings 11, 11. The brackets 10 are attached to a part 12 of a loom in spaced relation. The brackets are arranged approximately at the end of the stroke of the picker-stick 13 at or near the shuttle-box of the loom. A rod 14 is slidably supported by the bearings 11, 11 of each of the brackets 10. A check-member 15 preferably of U shape is attached to and connects the remote ends of the rods 14 and the said check-member 15 is disposed in the path of movement of the picker-stick 13 to be engaged thereby. The check-member 15 has laterally extending apertured ears or lugs 16. The ends of the rods 14 referred to extend through the apertures in the lugs 16, and nuts 17, 17 are disposed on opposite sides of each lug 16. The ends of the rods 14 are screw threaded as at 18 to accommodate the nuts 17, 17.

In order that the check-member 15 may yield to the action of the picker-stick 13 so as to arrest the same and to prevent undue wear and the breaking of the parts, there is provided a tensioning means which comprises coil springs 19 and adjustable stops 20. The stops 20 are adjustable along the rods 14. Set screws 21 serve to hold the stops 20 in the desired positions of adjustment on the rods. The springs 19 surround the rods 14. Each spring 19 is disposed between the stops 20 on the rod which it surrounds and one of the bearings 11 of the bracket which supports the rod.

From the foregoing it will be manifest that the check-member 15 is detachably and adjustably connected to the rods 14 thus allowing such part to be readily replaced as may be necessary; that by adjusting the stops 20, the tension of the springs 19 may be varied for the obtainment of the proper and desired working action of the device.

What is claimed is:

A device as characterized including a support, a pair of brackets attached to said support in spaced relation to each other and having bearings, rods slidably mounted in the bearings of said brackets, a check-member detachably connecting the rods and adjustable thereon, and check-member tensioning means including adjustable stops on said rods and springs between the stops and a bearing of each bracket respectively.

In testimony whereof I hereby affix my signature.

DIEU DONNE JODOIN.